Patented June 28, 1938

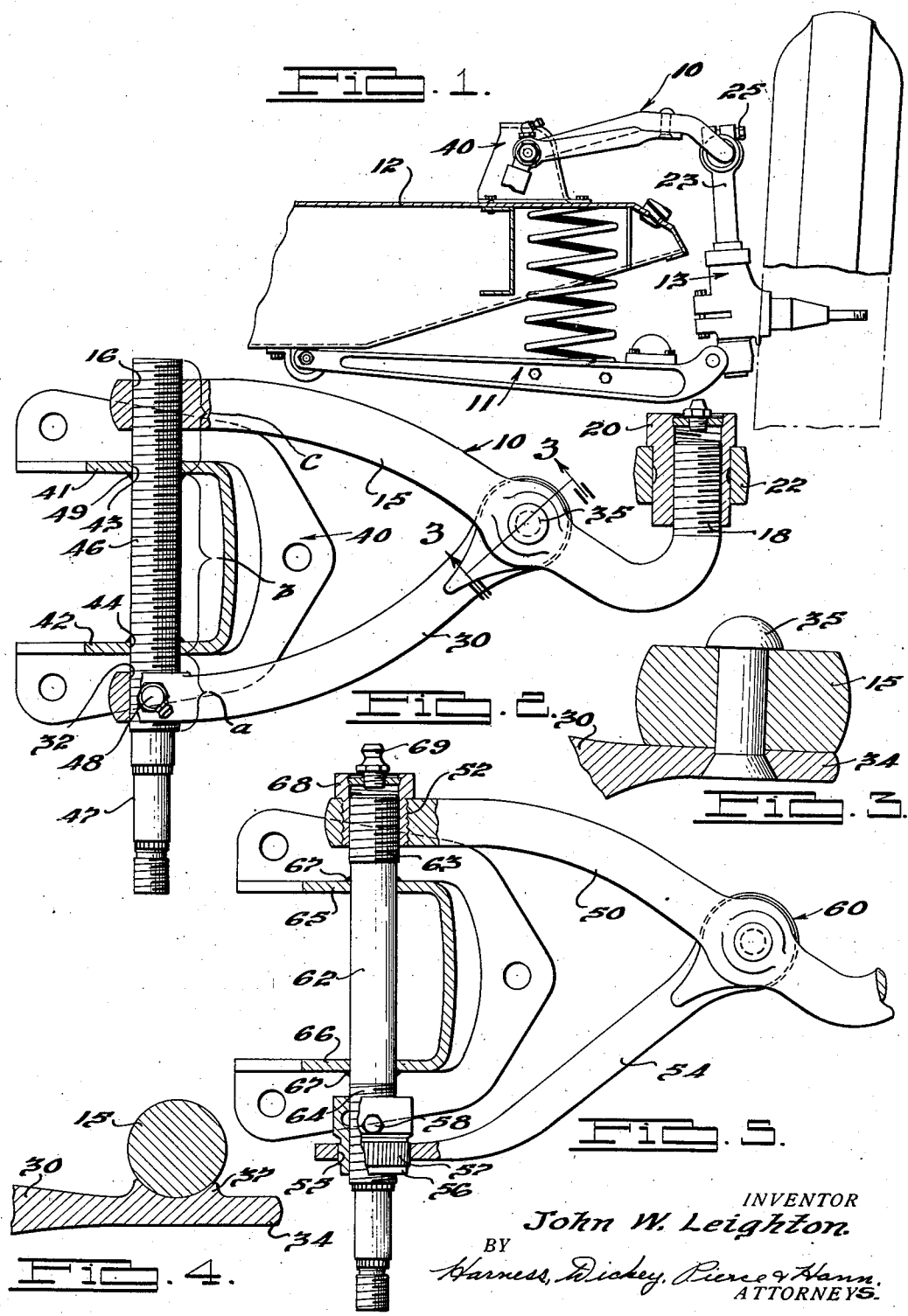

2,121,807

UNITED STATES PATENT OFFICE 2,121,807

INDEPENDENT WHEEL SUSPENSION

John W. Leighton, Port Huron, Mich.

Application May 23, 1936, Serial No. 81,351

6 Claims. (Cl. 267—20)

The invention relates to independent wheel suspensions, and particularly involves a modification and further simplification of the independent wheel suspension disclosed in applicant's copending applications Serial No. 59,808, filed January 20, 1936, and Serial No. 69,786, filed March 20, 1936.

It is the broad object of the present invention to provide an independent wheel suspension for vehicles which while fully effective for that purpose, is light in weight, has few parts and may be manufactured easily and inexpensively.

Among the more limited objects is the provision of a simplified link connection adapted for use between the wheel supporting member and the frame of a vehicle, and a simplified and improved pivotal mounting for such a link.

A further object of the invention is to provide an independent wheel suspension of the type mentioned in which threaded bearings are used throughout.

Another object of the invention is the provision of improved methods of making and assembling the parts which facilitate assembly and insure an accurate and predetermined spacing of the several parts.

Other objects and advantages will become apparent from the following specification, the accompanying drawing and the appended claims.

In the drawing:

Figure 1 shows a fragmentary front elevation of an automobile frame showing one front wheel and the preferred form of the independent wheel suspension.

Fig. 2 shows a plan view of the upper arm of the independent wheel suspension partly in section.

Fig. 3 is a fragmentary section taken on the line 3—3 of Fig. 2.

Fig. 4 shows an alternative form of the structure shown in Fig. 3.

Fig. 5 shows a view corresponding to Fig. 2 but of a modified form of the upper arm mechanism.

As shown best in Fig. 1, the independent wheel suspension is of the type in which is provided an upper arm 10 and a lower arm 11 pivotally connected at their inner ends to a transverse front frame member 12 of an automobile body and pivotally connected at their outer ends to an axle supporting member indicated generally at 13. The axle supporting structure may be of any desired construction, but is preferably of the type shown in applicant's co-pending application Serial No. 59,808, filed January 20, 1936. In any event the axes of the pivotal connections between the axle supporting member 13 and the arms 10 and 11 are parallel to the axes of the connections between the frame 12 and the arms 10 and 11 with the result that the wheel may move vertically with respect to the frame but cannot move laterally or longitudinally with respect thereto.

The novel features of the present invention reside in the construction and mounting of the upper arm mechanism 10. The remaining structure, including the frame 12, the lower arm 11, the axle supporting member 13 and the spring may be of any desired form, but is preferably made in accordance with applicant's above mentioned co-pending applications.

Referring to Fig. 2, the upper arm mechanism comprises a main bar 15 provided with an internally threaded aperture 16 adjacent its inner end. The bar 15 extends outwardly and slightly forwardly from the frame of the automobile, and thence, turning sharply, extends rearwardly at 18 to form a journal portion extending parallel to the axis of opening 16, which portion is provided with external threads. The threaded journal 18 is adapted to receive an internally threaded eccentric sleeve 20 which in turn is carried by an eye 22 on the upwardly extending shaft 23 of the wheel supporting member 13. The cooperating threads on the sleeve 20 and the journal 18 constitute threaded bearing surfaces. It will be observed that by rotating the sleeve 20 the camber adjustment of the wheel can be effected. The eye 22 is split and is provided with a pair of upstanding ears through which a bolt 25 extends to clamp the same upon the eccentric sleeve 20 and thus secure it in adjusted position, all as more fully disclosed in applicant's copending application Serial No. 733,487, filed July 2, 1934.

A reinforcing bar 30 is provided with an internally threaded aperture 32 at one end and at the other is provided with a flattened extremity 34 adapted to underlie and engage the bar 15. A rivet 35 extends through bar 15 and the extremity 34 of bar 30 to secure them fixedly together as shown best in Fig. 3. Or if desired, the flat extremity 34 of reinforcing bar 30 may be provided with a channel 37 adapted to receive the bar 15, as shown in Fig. 4, and the overlapping portions of bars 30 and 15 may be welded together.

A bracket member 40 is provided for securing the upper arm 10 to the frame member 12 of the vehicle and this bracket includes a pair of parallel spaced walls 41 and 42 containing aligned internally threaded apertures 43 and 44. A threaded bolt 46 is adapted to be threaded through the aperture 16 in bar 15, apertures 43 and 44 in the bracket 40 and aperture 32 in the reinforcing bar 30; and the bolt is provided with an extremity 47 to which may be connected a shock absorber in the usual manner. The cooperating threads on the bolt 46 and in the apertures 16 and 32 in bars 15 and 30, respectively, constitute threaded bearings about which the arm 10 may pivot. Suitable lubricating fittings 48 may be provided in connection with the apertures 16 and 32 for supplying lubricant to the threaded bearings.

In order to facilitate assembly of the arm 10 with the bracket 40 and at the same time secure a tight mounting of the threaded bolt 46 in the bracket and a suitable threaded bearing fit between the arms 15 and 30 and the extremities of the threaded bolt, the threads on the bolt 46 and the internal threads in the apertures 16, 32, 43 and 44 are so formed that the threads on the bolt will have a jam fit in the apertures 43 and 44 and a threaded bearing fit in the apertures 16 and 32. In the preferred form of the invention this is accomplished by providing progressively increased pitch diameters for the threads in the apertures 32, 44 and 43, the differences in the pitch diameters being very slight and the aperture 32 having the smallest diameter. The thread on the bolt, while in appearance a single continuous uniform thread, is provided with correspondingly stepped pitch diameters, the diameters of the various portions being very slightly different from each other. The threads on the lowermost section of the threaded portion of the bolt, indicated by the bracket "a" in Fig. 2, are of such pitch diameter that they will thread easily through the apertures 16, 43 and 44 and provide a suitable threaded bearing fit with the threads in aperture 32. The bolt section indicated "b" is given a slightly increased pitch diameter over the section "a" and is adapted to thread easily through the apertures 16 and 43 but to jam in the aperture 44 by reason of the fact that the pitch diameter of the bolt on section "b" is slightly greater than the pitch diameter of the threads in the aperture 44. The threaded section "c" of the bolt is of still further increased diameter and is adapted to have a threaded bearing fit with the aperture 16 but to jam with the threads of aperture 43, being of a slightly greater pitch diameter than the threads in the latter aperture. In view of this arrangement, it is apparent that when the arm 10 is held in finally assembled position with respect to the bracket 40, the bolt 46 may be easily threaded into position up to the point where the threads thereon jam with the threads in the apertures 43 and 44, whereupon a further limited turning of the bolt will tightly fix it to the bracket. Upon completion of this assembly, the bolt may be spot-welded at 49 to one of the walls of the bracket, if desired, to further secure it against accidental removal from the bracket. It is apparent that this is an exceedingly simple and effective way of securely fastening the threaded journal for the inner ends of arm 10 to the frame bracket 40.

The present invention contemplates a further refinement in the construction of the bolt 46 and the cooperating internally threaded apertures 16, 32, 43 and 44, and a novel method of assembling the arm with the bracket, both of which are designed to effect an accurate adjustment of the caster angle of the steering wheel of the vehicle. It is the universal practice and a matter of vital necessity with the steering wheels of automobiles to provide the same with the correct degree of caster angle, namely, the angle at which the kingpin of the steering wheel extends forwardly from the vertical at its upper end. In the present construction the function of the kingpin is performed by the shaft 23 of the wheel support, about which the wheel turns when steering, and hence it is the degree of upward and forward inclination of the shaft 23 with respect to the vertical which constitutes the caster angle. The provision of a caster angle on steering wheels, while of vital necessity, involves only a very minute forward displacement of the upper end of the kingpin; and in practice the caster angle is usually in the order of a degree. It is apparent, therefore, that in an independent wheel suspension it is vitally necessary to accurately fix the relative longitudinal position of the upper and lower arms of the wheel supporting mechanism, since, should either of these be moved longitudinally with respect to the other, it would vary the caster angle. In independent wheel suspensions using threaded bearings, the danger of longitudinal displacement of the arms of the wheel suspension during assembly is a serious one for the reason that there is no fixed abutment determining the longitudinal position of the arm in assembled position. On the contrary the threaded bearings operate equally effectively at any position along their length, and hence the arms are likely to be assembled in the wrong longitudinal position with respect to supporting brackets.

Accordingly in the present invention, to overcome these defects, the internal threads in the apertures 16, 43, 44 and 32 are so formed or cut as to begin at predetermined points about the peripheries of the apertures, which points are so selected that when the arms 15 and 30 are given the desired predetermined longitudinal spacing with respect to the bracket 40, the internal threads in the apertures 16, 43, 44 and 32 have a spiral continuity and may receive the bolt 46 without any change in their relative positions. This can be accomplished in several ways, but the simplest method is to begin the thread in each of the apertures at the upper faces of arm 15, walls 41 and 42 and arm 30, as viewed in Fig. 2, at points around the peripheries of the apertures 40 which will all lie in substantially the same plane containing also the axis of the bolt 46 when the arm 10 is assembled and in normal position with respect to the bracket 40. When this practice is followed, the bars 15 and 30 must be so formed that the spaces between the upper faces of the arm 15, wall 41, wall 42 and arm 30, as viewed in Fig. 2, are an even multiple of the pitch of the thread on bolt 46. If these faces are not spaced apart by an even multiple of the thread pitch, of course the threads in the apertures 16, 43, 44 and 32 must begin at angularly spaced points about the peripheries of the several apertures, depending upon the relative spacing between the arms and the bracket. To illustrate, if the upper face of the arm 15 is spaced from the upper face of wall 41 by one-half of the thread pitch in excess of an even multiple of the pitch, then the threads in the arm 15 and wall 41 would begin at points spaced 180° apart; and there is a direct relation between the angular displacement between the points at which the threads begin in the member 15 and wall 41 and the amount that the desired spacing of member 15 and wall 41 exceeds an even multiple of the thread pitch.

Having so formed the threads in the apertures 16, 43, 44 and 32 the bracket 40 and assembled arm 10 are placed in a suitable fixture which will hold them positively in the predetermined normal assembled position, in which position the internal threads in the apertures 16, 43, 44 and 32 will have a spiral continuity. While so holding the arm 10 and bracket 40, the bolt 46 is threaded into position, as previously described, to complete the assembly. It is apparent that if the device is constructed and assembled in the manner described above, the arm 10 will have a predetermined fixed longitudinal position with respect to the bracket 40 dependent upon the desired caster angle. It may be noted at this point that this caster angle is not adversely affected by pivotal movement of the arm 10 about the bolt 46 during operation of the vehicle for the reason that while such pivotal movement is accompanied by axial movement of the arm along the threads of the bolt, there is a corresponding, but oppositely directed axial movement of the sleeve 20 on the outer journal 18 of the arm 10. Since these axial displacements are equal and in opposite directions, they exactly compensate for each other and the caster angle of the wheels is not affected in any degree.

In Fig. 5 is shown a modified form of the invention corresponding to that shown in Figs. 1 and 2 except for the nature of the pivotal connection between the arm and the bracket 40. In this construction, the main bar 50 of the arm is provided with an aperture 52 having internal self-locking threads formed therein; and the reinforcing bar 54, which is riveted or welded to the bar 50, at 60, in the manner previously described, is provided with a smooth walled aperture 55. A sleeve 56 having a knurled portion 57 is pressed into the aperture 55 and held against relative rotation with respect to the bar 54 by the knurled surface. The inner surface of the sleeve 56 is provided with internal threads adapted to form one of the elements of a threaded bearing and a suitable lubricating fitting 58 is carried by the sleeve.

In this modification the bolt 62 is threaded only at its ends, at 63 and 64, the threads at the upper end 63 being of appreciably greater pitch diameter than those at the lower end at 64, and the central portion of the bolt is adapted to be received in relatively tight engagement with smooth apertures in the spaced parallel walls 65 and 66 of the bracket, and to be welded thereto at 67.

The aperture 52 in bar 50 is provided with a threaded bearing sleeve 68 having an external self-locking thread adapted to interlock with the thread in the aperture 52, and having an internal thread adapted to have a bearing engagement with the threads 63 of the bolt. A suitable lubricating fitting 69 is provided in the end of the sleeve 68.

It is apparent from the above that there has been provided, in accordance with the present invention, an exceedingly simple, inexpensive and readily assembled independent wheel suspension, which, at the same time, is quite rugged. While several modifications of certain features of the invention are shown, it is apparent that other modifications may be indulged in within the spirit of the appended claims.

I claim as my invention:

1. A pivotal link connection comprising a bar having at one end an opening adapted to receive a journal and having its other end bent into parallelism with the axis of said opening and formed to constitute a journal, a shaft adapted to be fixedly secured intermediate its ends to a supporting member and having journal portions at its ends, one of which is received in said bar opening, and a reinforcing bar pivotally mounted on the other shaft journal and connected to said first bar intermediate the ends of the latter.

2. A pivotal link connection comprising a bar having at one end an internally threaded opening adapted to receive a threaded journal and having its other end bent into parallelism with the axis of said opening and formed to constitute a threaded journal, a shaft adapted to be fixedly secured intermediate its ends to a supporting member and having threaded journal portions at its ends, one of which is received in said bar opening, and a reinforcing bar threaded on the other shaft journal and connected to said first bar intermediate the ends of the latter.

3. In an independent wheel suspension, means for supporting a wheel, upper and lower link mechanism for connecting said means to a vehicle body, one of said link mechanisms comprising a bar having an opening adjacent one end to receive a journal and having its opposite end bent in a line parallel to the axis of said opening and formed to constitute a journal, a straight shaft adapted to be fixedly secured intermediate its ends to an automobile frame and having journal portions at its ends, one of which is received in said opening, and a reinforcing bar pivotally mounted on the other shaft journal and connected to said first bar intermediate the ends of the latter.

4. In an independent wheel suspension, means for supporting a wheel, upper and lower link mechanism for connecting said means to a vehicle body, one of said link mechanisms comprising a bar having an internal threaded opening adjacent one end to receive a threaded journal and having its opposite end bent in a line parallel to the axis of said opening and formed to constitute a threaded journal, a straight shaft adapted to be fixedly secured intermediate its ends to an automobile frame and having threaded journal portions at its ends, one of which is received in said opening, and a reinforcing bar threaded on the other shaft journal and connected to said first bar intermediate the ends of the latter.

5. In combination, a vehicle having a frame, an externally threaded, longitudinally extending member secured intermediate its ends to said frame, a bar having a pivotal threaded bearing connection at one end with one end of said member, said bar extending laterally of the vehicle and having its other end bent into parallelism with said member, a reinforcing bar having a pivotal threaded bearing connection at one end with the opposite end of said member and having its other end secured to the first bar intermediate the ends of the latter, means for supporting a wheel pivotally connected to said other end of the first bar, and a pivotal link connecting said means to the frame of the vehicle independently of said bars.

6. A pivotal mounting for the link of an independent wheel suspension comprising a support having a threaded opening therein, a link having a pair of arms adapted to extend on opposite sides of the portion of said support containing the opening, axially aligned threaded openings in said arms, respectively, and an externally threaded member threaded into the openings in said support and arms for pivotally supporting the link, the threads in said support and arms being formed to begin at a predetermined point around the periphery of said openings whereby the arms of the link may be placed in a predetermined relative position with respect to said support prior to insertion of said threaded member and said support and arms will remain in said predetermined relative position when said member is inserted.

JOHN W. LEIGHTON.